Patented Sept. 1, 1931

1,821,255

UNITED STATES PATENT OFFICE

RAINALD BRIGHTMAN, OF BLACKLEY, MANCHESTER, ENGLAND, ASSIGNOR TO BRITISH DYESTUFFS CORPORATION LIMITED, OF MANCHESTER, ENGLAND

MANUFACTURE OF AZO DYESTUFFS

No Drawing. Application filed March 15, 1928, Serial No. 262,048, and in Great Britain April 22, 1927.

By this invention new and valuable azo dyestuffs are obtained by diazotizing the 4-nitro-4'-amino diphenyl sulphide, m. p. 143° C.

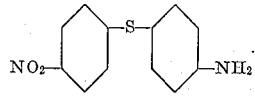

described by Kehrmann and Bauer (Berichte 1896, 29, 2362) and combining the diazo compound obtained with any of the known coupling components. The combination may be effected either in the presence of free mineral acid or organic acid or in the presence of free alkali. The dyestuffs so produced are represented by the following general formula

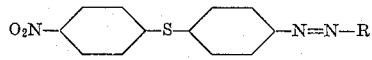

wherein R represents a coupling component. By choosing as coupling components substances which contain a free amino group, we obtain dyestuffs which can themselves be diazotized and combined with a further molecule of the same or a different coupling component. The dyestuffs so produced may be represented by the general formula

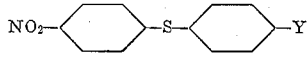

wherein Y is a substituent selected from a group consisting of $-N=N-R_4$ and $-N=N-R_6-N=N-R_4$, wherein $R_4$ is the coupled residue of an azo dye coupling component of the benzene, naphthyl and pyrazolone series, and $R_6$ is the coupled residue of an azo dye intermediate component of the benzene series. Further, the nitro-group in the monoazo colours formed may be reduced by the known methods, for example, with aqueous solutions of the sulphides of various metals or of ammonium sulphide. The aminoazo compounds thus produced may be diazotized and combined further with the same or a different coupling component. In this way I obtain dyestuffs which are identical with dyestuffs prepared from 4:4'-diamino diphenyl sulphide as described in our co-pending application Serial No. 270,572.

By suitable selection of components and conditions of coupling, I obtain dyestuffs which are valuable for dyeing vegetable or animal fibres, or regenerated cellulose silks, or cellulose esters. Certain of the dyestuffs I obtain give dyeings on wool which are fast to milling and some have the property of giving even dyeings on regenerated cellulose silks.

The following examples illustrate the invention, without limiting it, the parts being by weight.

*Example 1.*—246 parts of 4-nitro-4'-amino diphenyl sulphide are dissolved in water and 250 parts of 36 per cent hydrochloric acid. The solution is cooled with ice and stirred whilst an aqueous solution of 69 parts of sodium nitrite is added gradually. The diazo compound separates as a bright yellow solid. A solution of 245 parts of sodium 2-naphthylamine-6-sulphonate is now added and the mixture stirred until coupling is complete, when it is made alkaline by the addition of soda ash, heated up and the dyestuff, which has the probable structure:

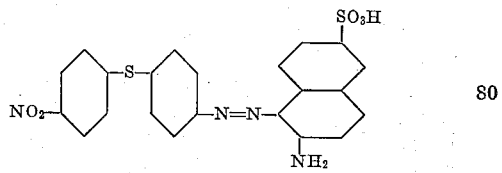

is filtered off after the addition of common salt. It forms a reddish powder, dyeing wool an orange shade fast to milling, stoving, washing and light.

If in place of sodium 2-naphthyl amine-6-sulphonate there is added a neutral solution of 224 parts of beta-naphthol-7-sulphonic acid and the mixture is worked up as before, the dyestuff obtained dyes wool in yellowish-red shades fast to milling and to light.

*Example 2.*—To the suspension of diazo-compound obtained as described above from 246 parts of 4-nitro-4'-amino diphenyl sulphide there is added a neutral solution of 239 parts of 2-amino-8-naphthol-6-sulphonic acid. 200 parts of sodium acetate crystals are now added and the mixture agitated until coupling is complete, when it is made alkaline and the dyestuff which has the probable structure:

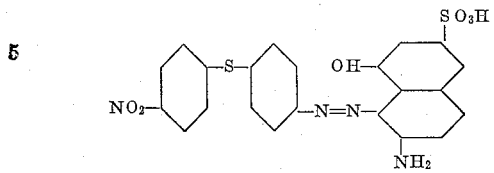

is isolated by the addition of common salt. It dyes wool a red shade, fast to milling and to light.

*Example 3.*—246 parts of 4-nitro-4'-amino diphenyl sulphide are diazotized with 250 parts of 36 per cent hydrochloric acid and 69 parts of sodium nitrite and the suspension of the diazo compound is stirred into a solution of 246 parts of beta-naphthol-6-sulphonate of sodium containing 370 parts of sodium carbonate. The mixture is stirred until coupling is complete, when it is heated up and the dyestuff which has the probable structure:

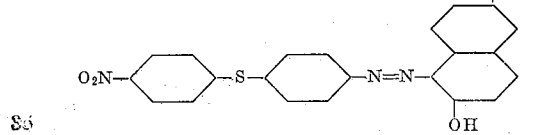

is isolated by the addition of common salt. It dyes wool a yellowish-red shade, fast to milling.

*Example 4.*—246 parts of 4-nitro-4'-amino diphenyl sulphide are diazotized in the usual way and to the suspension of diazo-compound there is added a neutral solution containing 323 parts of 1(2':5'-dichloro-4'-sulphophenyl)-3-methyl-5-pyrazolone. The mixture is stirred until coupling is complete when it is made alkaline, heated up and the dyestuff precipitated by the addition of common salt. It dyes wool a greenish-yellow shade. The dyestuff has in the form of the free acid the probable formula

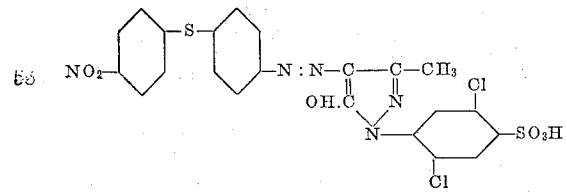

Similarly, by the use of a solution of 254 parts of 1(4'-sulphophenyl)3-methyl-5-pyrazolone there is obtained a dyestuff dyeing wool a yellow shade.

*Example 5.*—To a cold solution of 138 parts of salicylic acid in 40 parts of sodium hydroxide and 400 parts of sodium carbonate there is added, with stirring, the diazo suspension obtained as described above from 246 parts of 4-nitro-4'-amino diphenyl sulphide. The mixture is stirred until coupling is complete, when it is treated with a solution of 400 parts of sodium sulphide crystals and stirred and heated until reduction is complete. The aminoazo compound is precipitated by the addition of common salt and filtered off. It is then dissolved in water and diazotized by the addition of 69 parts of sodium nitrite and 300 parts of 36 per cent hydrochloric acid. After stirring to complete the diazotization the suspension of diazo-compound is run into a solution of 315 parts of 2-phenylamino-8-naphthol-6-sulphonic acid containing 450 parts of sodium carbonate. After stirring until coupling is complete the mixture is heated up and the dyestuff which has the probable structure:

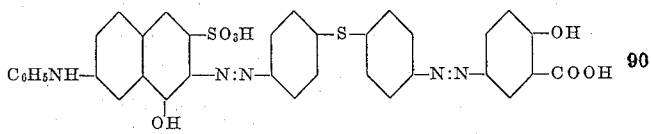

is isolated by the addition of common salt. It forms a dark powder dyeing viscose silk a brown shade and has the properties of the dyestuff obtained by coupling one molecule of *pp'*-diamino diphenyl sulphide in alkaline solution with one molecule of salicylic acid and one molecule of 2-phenyl amino-8-naphthol-6-sulphonic acid as described in our co-pending application Serial No. 270,572. Similarly, the dyestuff giving reddish-brown dyeings on viscose silk, obtained by substituting 2-amino-8-naphthol-6-sulphonic acid for 2-phenyl amino-8-naphthol-6-sulphonic acid in the above example, has all the properties of the dyestuff analogously prepared from 4:4'-diamino diphenyl sulphide as described in our said co-pending application Serial No. 270,572.

*Example 6.*—To the suspension of diazo-compound obtained from 246 parts of 4-nitro-4'-amino diphenyl sulphide there is added a solution of 137 parts of meta-amino-para-cresol methyl ether in 100 parts of 36 per cent hydrochloric acid. 272 parts of sodium acetate crystals are added and the mixture is stirred until coupling is complete, when the dyestuff is filtered off, suspended in 250 parts of 36 per cent hydrochloric acid and diazotized by the addition of 69 parts of sodium nitrite, the temperature being kept low by the addition of ice. The suspension of diazo-compound is stirred into a solution of 337 parts of the sodium salt of 2-phenyl-amino-5-naphthol-7-sulphonic acid containing 350 parts of soda ash. The mixture is maintained alkaline and stirred until coupling is complete when it is heated up and the dyestuff which has the probable structure:

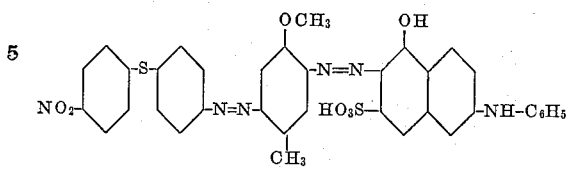

is isolated by the addition of common salt. It dyes viscose silk and wool in violet shades.

*Example 7*.—To the suspension of diazo compound obtained in the usual way from 246 parts of 4-nitro-4'-amino-diphenyl sulphide there is added a neutral solution of 174 parts of 1-phenyl-3-methyl-5-pyrazolone. The mixture is stirred until coupling is complete when it is heated up and the bright yellow insoluble dyestuff is filtered off. It dyes cellulose acetate a yellow shade. The dyestuff has the probable formula

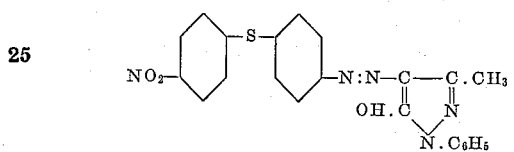

If in place of 174 parts of the pyrazolone the diazo suspension is combined with 108 parts of metaphenylene diamine in sodium carbonate solution, there is obtained a dyestuff giving yellow brown dyeings on cellulose acetate silk. Similarly with 138 parts of salicylic acid in presence of sodium carbonate there is obtained a dyestuff dyeing cellulose acetate silk a yellow shade and with 144 parts of beta-naphthol a dyestuff giving reddish-brown dyeings on cellulose acetate silk.

What I claim and desire to secure by Letters Patent is:—

1. The process of manufacture of new azo dyes which comprises diazotizing 4-nitro-4'-amino diphenyl sulphide and coupling the diazo compound with a coupling component of the benzene, naphthyl and pyrazolone series.

2. A process for the manufacture of new monoazo dyes which comprises diazotizing 4-nitro-4'-amino diphenyl sulphide and coupling the diazo compound with a sulphonated aminonaphthalene.

3. A process for the manufacture of new monoazo dyes which comprises diazotizing 4-nitro-4'-amino diphenyl sulphide and coupling the diazo compound with a naphthyl amino sulphonic acid.

4. A process for the manufacture of new monoazo dyes which comprises diazotizing 4-nitro-4'-amino diphenyl sulphide and coupling the diazo compound with a beta-naphthyl-amino sulphonic acid.

5. The new monoazo dye, which has in the form of its sodium salt the probable formula

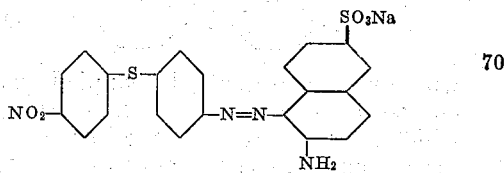

the said dye being a reddish orange powder, which dissolves, when in the form of its sodium salt, in water to an orange coloured solution, and which gives in concentrated sulphuric acid a blue solution and on dilution of this solution a yellowish brown precipitate.

6. New monoazo dyes which are also useful as intermediates in the production of other azo dyes, having the probable structure

wherein R represents a coupling component of the benzene, naphthyl and pyrazolone series.

7. New monoazo dyes which are also useful as intermediates in the production of other azo dyes, having the probable structure

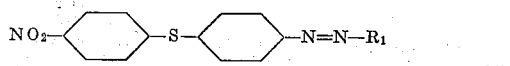

wherein $R_1$ represents a sulphonated amino naphthalene.

8. New monoazo dyes which are also useful as intermediates in the production of other azo dyes, having the probable structure

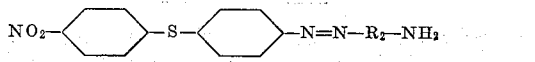

where $R_2$ represents a naphthalene residue containing a sulphonic acid group, the said dyes being powders which vary in shade from orange to red, brown, dark brown and black and are soluble in water in the form of their sodium salts.

9. A process of manufacturing new azo dyes which comprises diazotizing 4-nitro-4'-amino-diphenyl sulphide and coupling the diazo compound with an azo dye component of the benzene series which contains an amino group and which is capable of diazotization and coupling to a second component of the benzene, naphthyl and pyrazolone series.

10. New azo dyes having the probable structure

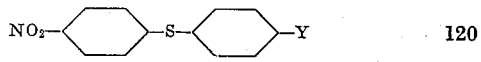

where Y is a substituent selected from a group consisting of $-N=N-R_4$ and $-N=N-R_6-N=N-R_4$ wherein $R_4$ is the coupled residue of an azo dye coupling component of the benzene, naphthyl and pyrazolone series, and $R_6$ is the coupled residue of an azo dye intermediate component of the benzene series.

11. New azo dyes having the probable structure:

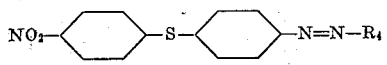

wherein $R_4$ represents the coupled residue of an azo dye component of the benzene series which may be attached by an azo group to a second azo dye component of the benzene, naphthyl and pyrazolone series.

12. New azo dyes having the probable structure

wherein $R_6$ represents the coupled residue of an azo dye intermediate component of the benzene series and $R_4$ represents a coupled amino-naphthol sulphonic acid.

13. The new azo dye having in the form of its sodium salt the probable structure

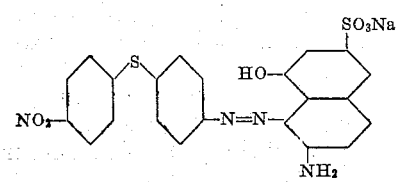

the said dye being soluble in water and dyeing wool a red shade, fast to milling and to light.

14. The new azo dyes having the probable structure

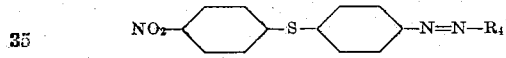

wherein $R_4$ represents the coupled residue of one of the following sulphonated naphthalenes

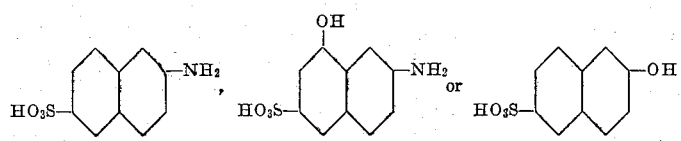

In testimony whereof I affix my signature.
RAINALD BRIGHTMAN.